United States Patent [19]

Takeuchi et al.

[11] Patent Number: 4,769,356

[45] Date of Patent: Sep. 6, 1988

[54] CATALYST FOR PURIFYING EXHAUST GAS

[75] Inventors: Yasuhiro Takeuchi, Hirakata; Atsushi Nishino, Neyagawa; Yukiyoshi Ono, Hirakata; Hironao Numoto, Katano, all of Japan

[73] Assignee: Matsushita Electric Industrial Co., Ltd., Osaka, Japan

[21] Appl. No.: 875,082

[22] Filed: Jun. 17, 1986

[30] Foreign Application Priority Data

Jun. 20, 1985 [JP] Japan ................... 60-134574
Jun. 20, 1985 [JP] Japan ................... 60-134575

[51] Int. Cl.$^4$ .............................. B01J 21/04
[52] U.S. Cl. ............................. 502/242; 502/243; 502/250; 502/262; 502/263; 502/328; 502/330; 502/334; 502/341; 502/344; 502/350; 502/439; 423/213.2; 423/213.5; 423/598
[58] Field of Search ............. 502/344, 350, 351, 355, 502/242, 243, 263, 439, 250, 341, 262, 328, 330, 334, 341; 423/213.2, 598, 213.5

[56] References Cited

U.S. PATENT DOCUMENTS

| | | | |
|---|---|---|---|
| 3,892,897 | 7/1975 | Rittler | 502/351 |
| 3,903,242 | 9/1975 | Meissner | 502/324 |
| 3,928,533 | 12/1975 | Beall et al. | 423/213.2 |
| 3,996,163 | 12/1976 | Crump et al. | 502/242 |
| 4,042,615 | 8/1977 | Vannice et al. | 502/242 |
| 4,113,660 | 9/1978 | Abe et al. | 502/242 |
| 4,120,942 | 10/1978 | Spitzer et al. | 502/355 |
| 4,173,485 | 11/1979 | Woditsch et al. | 423/598 |
| 4,273,724 | 6/1981 | Kugler et al. | 502/337 |
| 4,482,642 | 11/1984 | Ettlinger et al. | 502/263 |
| 4,496,469 | 1/1985 | Morimoto et al. | 501/134 |
| 4,537,873 | 8/1985 | Katu et al. | 502/351 |
| 4,547,525 | 10/1985 | Kim | 518/713 |
| 4,587,041 | 5/1986 | Uedaira et al. | 423/598 |
| 4,609,694 | 9/1986 | Morimoto et al. | 423/598 |
| 4,652,439 | 3/1987 | Nishiuchi et al. | 423/598 |
| 4,666,566 | 5/1987 | Mizutani et al. | 204/412 |

OTHER PUBLICATIONS

Fesenko et al., Chemical Abstracts, 102, Column 153673w (1985).
Popil'skii et al., Chemical Abstracts, 102, Column 153672v (1985).

Primary Examiner—Helen M. S. Sneed
Assistant Examiner—Anthony McFarlane
Attorney, Agent, or Firm—Wenderoth, Lind & Ponack

[57] ABSTRACT

Catalysts of reduced cost, for purifying exhaust gases, having smaller thermal expansion coefficients than conventional catalysts, good mechanical strength and large specific surface area are provided at low temperatures. The composition composed of at least re-hydrable alumina, an alkali or alkaline earth metal titanate and fused silica is thermally processed at comparatively low temperatures so as to provide ceramic catalyst carriers which have superior properties.

3 Claims, 4 Drawing Sheets

A --- rehydrate alumina
B --- potassium titanate
C --- fused silica

X 20000

X 20000

CATALYST FOR PURIFYING EXHAUST GAS

BACKGROUND OF THE INVENTION

The present invention relates to ceramic moldings small in thermal expansion coefficient, and, more particularly, to catalysts for purifying the combustion exhaust gases for use in vehicles, industries and for public welfare.

The cordierite series ceramics are mostly used as ceramics of low thermal expansion coefficient in the conventional catalyst carriers for purifying the exhaust gases. In addition, alumina series ceramics and mullite series ceramics are also used. However, these alumina series ceramics and mullite series ceramics have three to five times the thermal expansion coefficient of many cordierite series ceramics, thus resulting in lower practical rate.

The cordierite ceramics, having the formula $2MgO \cdot 2Al_2O_3 \cdot 5SiO_2$, are composed of a mixture of talc ($Mg_3(Si_4O_{10})(OH)_2$), kaoli ($Al_2Si_2O_5(OH)_4$) and alumina ($Al_2O_3$). The mixture is deaired, molded, dried, sintered.

The respective component % by weight of the theoretical composition cordierite is MgO 13.8%, $Al_2O_3$ 34.9%, $SiO_2$ 51.3%.

Also, the sintering temperature is about 1,400° C. and the sintering is normally performed for about one week. This thermal expansion coefficient is 1.2 to $1.4 \times 10^{-6}$/degree (room temperature ~1000° C.).

Even in the alumina series and mullite series ceramics, the sintering temperature is as high as 1,300° C. or more, as disclosed in Japanese Patent Publications (examined) No. 54-1565 and No. 51-20358.

In this manner, in the conventional catalyst carrier composed of cordierite series ceramics, alumina series ceramics or mullite series ceramics, the high-temperature sintering operation was performed to produce substances small in thermal expansion coefficient so as to improve the mechanical strength. These carriers of the conventional method became extremely glassy during the sintering operation, thus considerably reducing the specific surface area i.e., the specific surface area in the case of the cordierite series ceramics was 1 m$^2$ or lower per gram. Accordingly it is difficult to carry the catalyst substance directly on the conventional catalyst carrier.

Even if the catalyst carrying operation is performed, it is insufficient as the catalyst for purifying the exhaust gases. This is because the carried noble metal is likely to move and diffuse on the carrier during heating, thus suddenly deteriorating the catalyst performance.

Thus, in the conventional catalyst carrier composed of this type of cordierite series, alumina series or mullite series, the prior treatment, a so called wash coat, in which powders such as $\gamma$-$Al_2O_3$ or the like are coated on the surface is carried beforehand. Thereafter, the catalyst substance is carried.

Also, the catalyst carriers composed of the conventional cordierite series ceramics when sintered, contract by about 30% respectively in three dimensions during the scattering operation. Thus, they are difficult to maintain as to accuracy of size, are complicated to manufacture, and are inferior in product yield. Also, the cost thereof becomes higher because of the high sintering temperature. Furthermore, when the thermal expansion coefficient was 1.2 to $1.4 \times 10^{-6}$ per degree (room temperature ~1,000° C.) cracks and splitting occurred during practical use. In particular, in the catalysts, for the vehicles, the thermal shock requirements have become stricter in recent years due to the higher performance of the engine so that thermal expansion coefficients are obliged to be reduced.

SUMMARY OF THE INVENTION

Accordingly, an object of the present invention is to provide catalysts, for purifying the exhaust gases, of lower cost and excellent properties wherein the thermal expansion coefficient is smaller than that of the conventional ones, the mechanical strength is provided at the low temperatures, even in the thermal processing temperatures and the specific surface area is large.

For the solution of the conventional problems, the present invention thermally processes, at comparatively low temperatures, the composition composed of at least rehydrable alumina and alkali or alkaline earth metal titanate, to provide ceramics which have superior properties as carriers. The ceramics are provided as carriers for catalysts for purifying exhaust gases.

The rehydratable alumina is transition alumina, such as $\rho$-$Al_2O_3$, amorphous alumina or the like, with the exception of $\alpha$-$Al_2O_3$ which is provided through the thermal cracking of the alumina hydrate.

Industrially, alumina hydrate such as alumina trihydrate or the like which is provided from, for example, the Bayer process, is normally brought into contact with the hot gas for a few minutes or alumina hydrate is normally retained for one minute to four hours at about 250° through 900° C. under decreased pressure, so that the loss on ignition is approximately 0.5 through 15% by weight.

The alkali or alkaline earth metal titanate is substance having the general formula $M'_2O \cdot nTiO_2$, wherein M' is an alkali or alkaline earth metallic atom selected from lithium, sodium, potassium, rubidium, cesium, barium, strontium and calcium and n is an integer of 1 to 8.

The catalyst carrier, which is superior in thermal shock resistance for reasons which are not clear, is relatively large in specific surface area and is provided through the thermal treatment of the composition composed of at least the above-described two components. The catalyst carrier for purifying the exhaust gases may have molding assistant, (for example, carboxy-methylcellulose, methylcellulose) and plasticizer (glycerin, vaseline), etc. optionally added in addition to the rehydrable alumina, the alkali or alkaline earth metal titanate. Also, heat-resisting material such as fused silica powder, synthetic cordierite powder, mullite powder, chamotte or the like may be added.

It is generally known that the composition composed of a bonding agent such as a cement material or the like with the use of these heat-resisting materials is thermally processed to cause the cement agent and the synthetic cordierite powder to react to produce the new ceramics.

However, such phenomena as described hereinabove could not be recognized although the combination of at least two components.

It is optimum in terms of the thermal shock resistance, that the mixing ratio between the re-hydrable alumina and the alkali or alkaline earth metal titanate be within the range of (1:1) to (10:1) by weight. Also, the ratio between the re-hydrable alumina and the alkali or alkaline earth metal titanate is preferably within the range of the (1:1) to (1:10) by weight even in the case where the fused silica powder, the synthetic cordierite powder, the mullite powder, chamotte and so on may be added. Also, the total amount of the re-hydrable alumina and the alkali or alkaline earth metal titanate is preferably 10% or more by weight in terms of pressure-resistance strength, thermal shock resistance and catalyst performance.

The fused silica is superior in terms of the thermal shock resistance and catalyst performance from among the fused silica, the synthetic cordierite powder, the mullite powder, the chamotte, etc.

It is generally known that the fused silica is the smallest among the substances in thermal expansion coefficient, which is $0.5 \times 10^{-6}$/degree (room temperature through 1,000° C.). Although it is known as a material for reducing the thermal expansion, it is a glass forming oxide. When it is thermally treated at the temperature of 1,000° C. or more with a mixture of the other substances (for example, an alkali or alkaline earth metal component such as sodium, potassium, calcium or the like, and alumina, titania, etc.), crystal materials such as cristobalite or tridynite or the like are formed and the thermal expansion coefficient rapidly increases to 4 to $5 \times 10^{-6}$/degree (room temperature $\sim 1,000°$ C.). In this respect, it is not used conventionally as a ceramic superior in thermal shock resistance like the present invention. However, when the composition composed of at least the rehydratable alumina, the alkali or alkaline earth metal titanate and the fused silica is thermally treated in the range of 1,100° through 1,300° C. to produce the catalyst carrier, the carrier is superior in thermal shock resistance and is comparatively large in specific surface area, although the reason is not apparent.

Then, the properties the catalyst carrier produced through the present invention is $1.4 \times 10^{-6}$/degree (room temperature $\sim 1,000°$ C.) in thermal expansion coefficient, although it is somewhat different in ratio of compounded materials and thermal treatment temperature. Also, the thermal shock resistance is superior, with the thermal shock temperature being between 500° and 850° C. The specific surface area is 10 m²/g, although it is different in the ratio of compounded materials and the thermal treatment temperature.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1B:
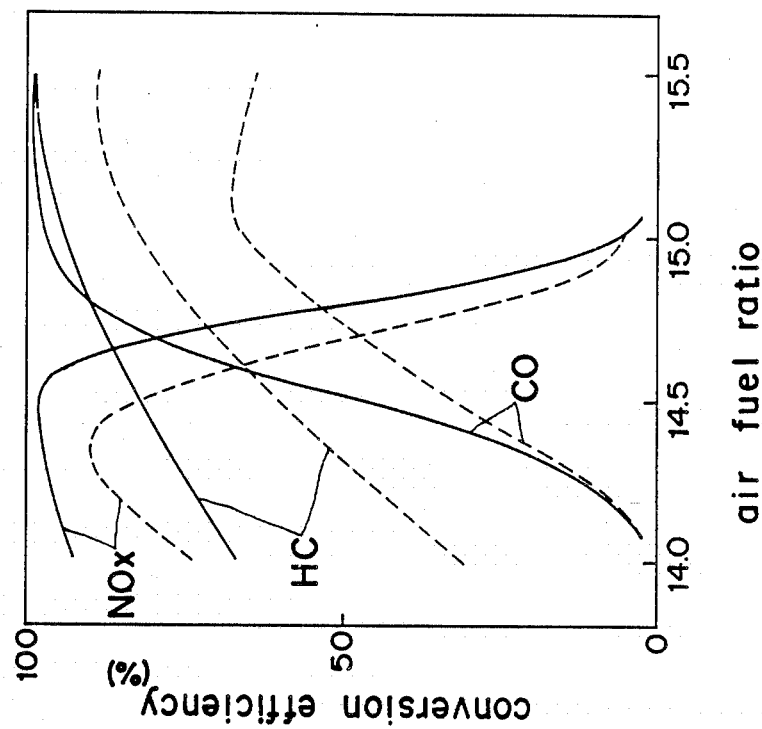
FIGS. 1(A) and (B) are graphs showing the relationship of the purification rate to the air fuel ratio of catalyst for purifying exhaust gases in one embodiment of the present invention and for a comparative example, respectively.

Referring now to the drawings, there are shown the embodiments of the present invention as catalysts for purifying exhaust gases.

Embodiment 1

A mixture is formed by adding 30 parts by weight of water to 50 parts by weight of rehydratable alumina and 50 parts by weight of potassium titanate ($K_2O.6TiO_2$). The mixture is kneaded for ten minutes by the use of a screw needle, thereafter is fed to a screw-form extruder and into a honeycomb mold in the shape of a square cell, 100 m/m in $\phi$, 100 m/m in length, 0.3 m/m in wall thickness, 1.5 m/m on one side. It is heated up to 1,200° C. at a rate of 100° C. per hour, further is thermally treated for one hour at 1,200° C. The honeycomb shaped ceramics provided in this manner are provided at the catalyst carrier, platinum (Pt) and rhodium (Rh) are carried at 1.0 g and 200 mg per liter catalyst carrier, respectively. The platinum is derived from chloroplatinate ($H_2PtCl_6$), the rhodium is derived from rhodium nitrate ($Rh(NO_3)_3$). The compounds are mixed so that the weight ratio between the Pt and the Rh becomes 5:1, the water solution is placed on the carrier.

It is dried, thereafter is thermally processed at 500° C. in $N_2$ atmosphere. It is provided as catalyst for purifying the exhaust gases. Also, the cordierite series catalyst carrier on the market is used for comparison. The platinum rhodium is carried likewise in the same manner as a comparative example.

The two catalysts for purifying the gases are evaluated by the two evaluation methods.

1. The CO purification rate at 200° C. in the catalyst temperature is space velocity: 20,000 $H^{-1}$, CO entrance concentration: 600 ppm (in air) with the use of the catalyst for purifying the exhaust gases. Under these conditions, the initial purifying performance and the purifying performance after 50 hours thermal treatment operation at 1,000° C. in the electric furnace are measured and evaluated.

2. The catalysts for purifying the exhaust gases are respectively placed on the exhaust gas route of a 2,800 cc engine mounted vehicle. The air fuel ratio is varied by the width of 0.1 within the ratio of 14.0 through 15.5. The purification ratio of the CO, HC, NO gases is measured, evaluated at the initial stage and after 50 hours of bench endurance.

Figure 1A:
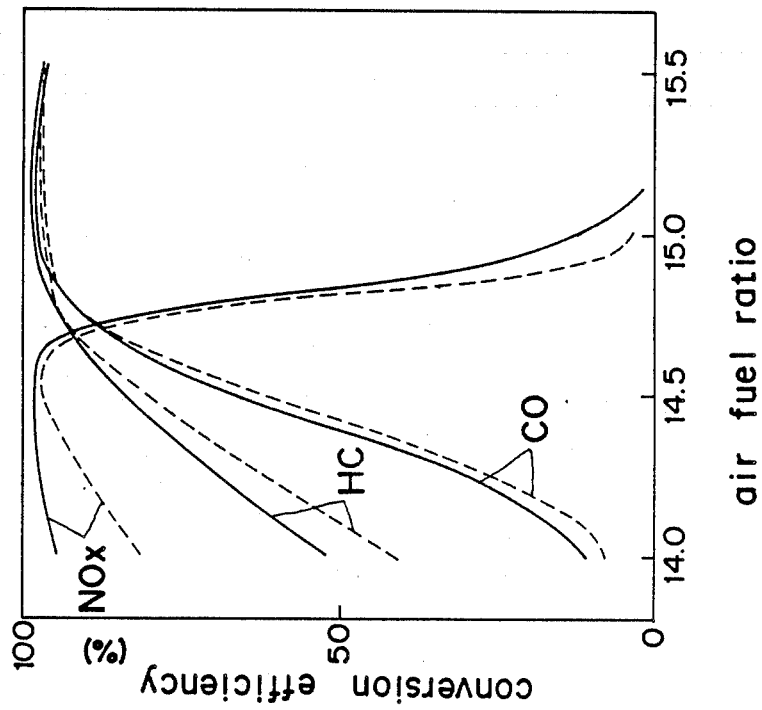
Figure 2:
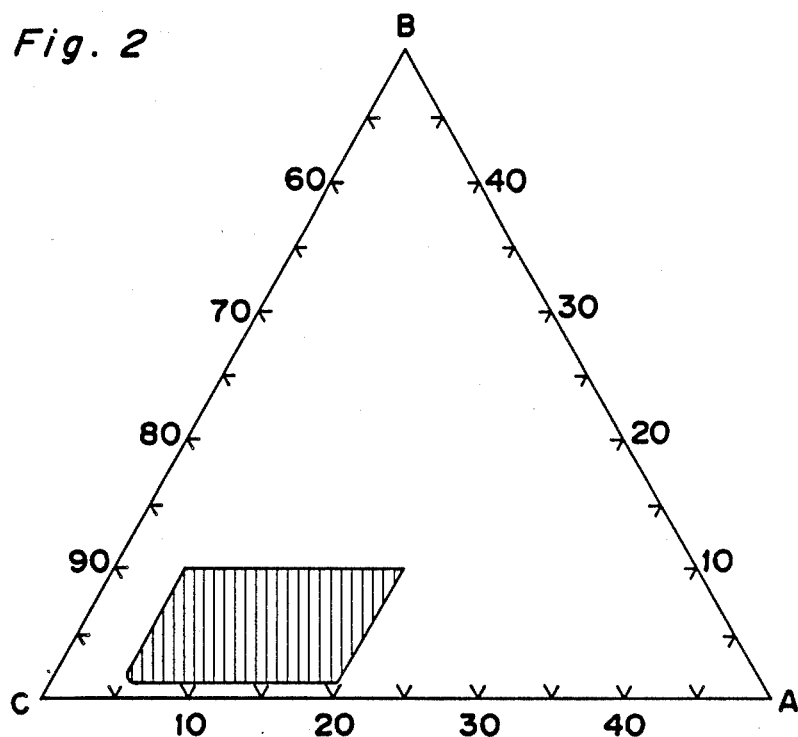
FIG. 2 is a diagram showing the composition range of the carrier for purifying the exhaust gases.

The results by evaluation method 2 are shown in FIG. 1, A, b. The A is the results of the catalyst of the present invention, the B shows the results of the comparison examples composed of the cordierite series carrier.

TABLE 1

|  | Catalyst of the Invention | Comparative Example |
| --- | --- | --- |
| Initial | 100% | 100% |
| After thermal Processing | 89% | 65% |

In Table 1 the term "after thermal processing values" represents the value of the CO purifying coefficient obtained after the thermal treatment operation with respect to catalysts as disclosed in above-discussed method 1 and the term "initial values" represents the CO purifying coefficient of catalysts which are not subjected to such thermal treatment.

As apparent from Table 1, the catalyst in the comparative example is larger in the thermal deterioration as compared with the catalyst of the present invention. Likewise, even in the bench endurance test results shown in FIGS. 1(A) and 1(B), the catalyst in the comparative example is larger in deterioration from the initial stage with respect to each of CO, HC and $NO_x$ component gases.

In this regard, the term "thermal deterioration" refers to the fact that the catalysts of the present invention and of the Comparative Example are similar in the supported catalytic compositions, but different in carriers, and the marked reduction of the CO purifying coefficient after the thermal treatment in the Comparative Example indicates that the carrier performance is deteriorated by the thermal treatment.

Embodiment 2

A mixture formed from 4.0 parts by weight of methylcellulose as molding assistant, 2.0 parts by weight of glycerin as plasticizer and 31 parts by weight of water is added to 30 parts by weight of rehydratable alumina, 30 parts by weight of potassium titanate ($K_2O \cdot 6TiO_2$), 40 parts by weight of synthetic cordierite powder to manufacture the honeycomb shaped ceramics (sample No. 1) in the same manner as in embodiment 1. Also, even when 40 parts by weight of mullite powder, instead of 40 parts by weight of synthetic cordierite powder are added in the composition, the honeycomb shaped ceramics are manufactured in the same manner as in embodiment 1 for evaluation of the thermal shock resistance, and the platinum, rhodium catalysts are also carried as in embodiment 1 for evaluation by evaluation method 1. The results are shown in Table 2.

TABLE 2

| Sample No. | Thermal Shock Resistance Temperature (°C.) | CO Conversion Efficiency (%) | |
|---|---|---|---|
| | | Initial | After thermal treatment |
| No. 1 | 650 | 100 | 83 |
| No. 2 | 500 | 100 | 82 |

As apparent from Table 2, if the synthetic cordierite powder or the mullite powder are used, ceramics superior in the thermal shock resistance are provided when they are combined with the indispensable component of the present invention and further, the deterioration in catalyst performance because of the heat is smaller.

In the composition including the synthetic cordierite powder, the mullite powder $\alpha$-$Al_2O_3$ is used instead of the rehydratable alumina, titanium oxide of anatase type is used instead of alkali or alkaline earth metal titanate for evaluation, but they are not satisfactory in the thermal shock resistance and catalyst performance.

Embodiment 3

A mixture from 4.0 parts by weight of methylcellulose as molding assistant, 2.0 parts by weight of glycerin as plasticizer and 31 parts by weight of water is added to 10 parts by weight of rehydratable alumina, five parts by weight of potassium titanate ($K_2O \cdot 6TiO_2$) and 85 parts by weight of fused silica (sample a) and the honeycomb is shaped in the same manner as in embodiment 1. Also, 85 parts by weight of synthetic cordierite powder (sample b), mullite powder (sample c) are used respectively, instead of 85 parts by weight of fused silica, in the composition and the honeycomb shaped ceramics are manufactured in the same manner as in embodiment 1 for the evaluation of the thermal shock resistance. The platinum, rhodium catalyst substances are also deposited on the carrier as in embodiment 1 for evaluation by evaluation method 1. The results are shown in Table 3.

TABLE 3

| Sample No. | Thermal Shock Resistance Temperature (°C.) | CO Conversion Efficiency (%) | |
|---|---|---|---|
| | | Initial | After thermal treatment |
| No. a | 850 | 100 | 96 |
| No. b | 700 | 100 | 81 |
| No. c | 550 | 100 | 81 |

As apparent from Table 3, ceramics provided through the combination with the fused silica as compared with the combination of the synthetic cordierite powder or mullite powder and the indispensable component of the invention are small in the deterioration of the thermal shock resistance, furthermore in the deterioration through the heat of the catalyst performance.

Embodiment 4

Figure 3:
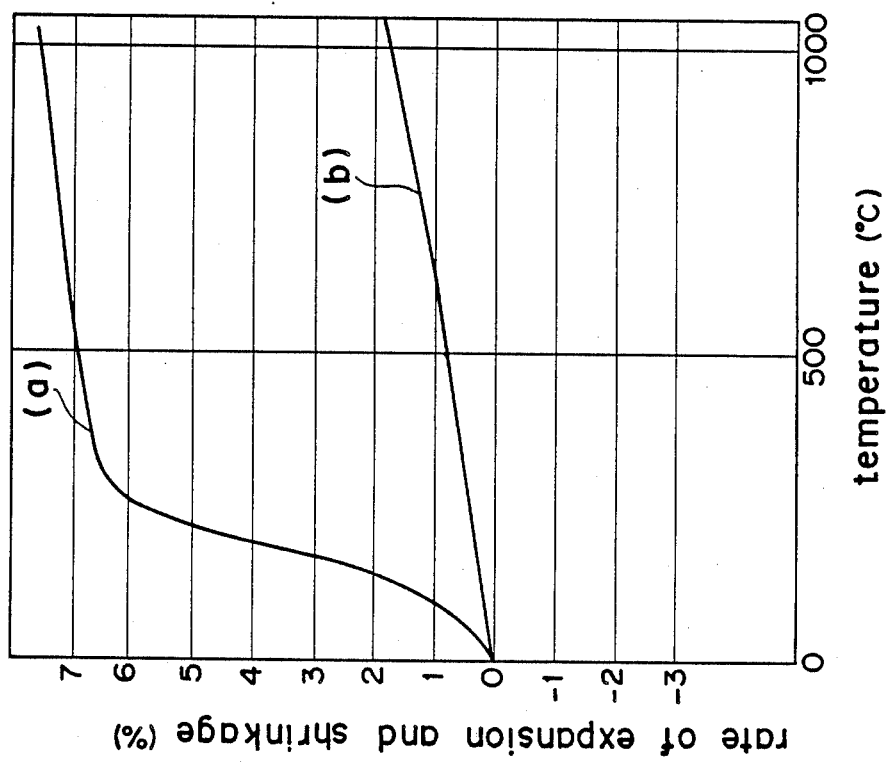
FIG. 3 is a graph showing the relationship between the rate of the expansion and shrinkage (%) and the temperature of the carrier of the catalyst for purifying the exhaust gases.

The rehydratable alumina, potassium titanate, fused silica are variably changed in ratio, the molding assistant, plasticizer, water are added as in embodiment 3, the honeycomb shaped ceramics are manufactured as in embodiment 3 for the evaluation of the thermal shock resistance. The platinum and rhodium catalyst substances are also carried as in embodiment 1 for the evaluation by evaluation method 1. As a result, the composition superior in the thermal shock resistance is in the range of 5 through 20 parts by weight of rehydratable alumina in the inclined line portion of FIG. 3, 1 through 10 parts by weight of alkali titanate, 70 through 94 parts by weight of fused silica. Also, the thermal expansion-shrinkage ratio with respect to the temperature except for the range is as in FIG. 3 curve (a). In the composition of the present invention, it becomes as in FIG. 3 curve (b). It is easily considered from the curve line of (a), that it is partially crystallized from the fused silica, and that cristobalite, tridymite, etc. are produced. It coincides that the thermal expansion coefficient is large and that the thermal shock resistance is inferior. The catalyst performance results by evaluation method 1 are shown in Table 4.

TABLE 4

| | Composition of the Present Invention | Comparison Example |
|---|---|---|
| Initial | 100% | 100% |
| After Thermal Treatment | 96% | 75% |

As apparent from Table 4, in the composition outside the range of the present invention, the thermal deterioration is large. However, the thermal deterioration is smaller as compared with the catalyst which comes from the conventional cordierite series catalyst carrier.

Although the reason is not apparent, it is considered that the noble metals of platinum, palladium are partially diffused, thus reducing the catalyst performance.

Embodiment 5

A mixture from 50 parts by weight of re-hydrable alumina, 50 parts by weight of alkali or alkaline earth metal titanate which is composed of an alkali or alkaline earth metal element selected from lithium, sodium, potassium, rubidium, cesium, barium, strontium and calcium, 4.0 parts by weight of methylcellulose as the molding assistant, 2.0 parts by weight of glycerin as plasticizer, 32 parts by weight of water are added to manufacture the honeycomb shaped ceramics as in embodiment 1. The platinum, rhodium catalyst substances are also carried as in embodiment 1 for evaluation by evaluation method 1. The results are shown in Table 5.

TABLE 5

| | Alkali or Alkaline Earth Metal Titanate | CO Conversion Efficiency (%) | |
|---|---|---|---|
| | | Initial | After thermal Treatment |
| No. 1 | Lithium Titanate | 100 | 80 |
| No. 2 | Sodium Titanate | 100 | 29 |
| No. 3 | Potassium Titanate | 100 | 89 |
| No. 4 | Rubidium Titanate | 100 | 79 |
| No. 5 | Cesium Titanate | 100 | 80 |
| No. 6 | Barium Titanate | 100 | 78 |
| No. 7 | Strontium Titanate | 100 | 79 |
| No. 8 | Calcium Titanate | 100 | 81 |

As apparent from Table 5, the composition composed of rehydratable alumina and each alkali or alkaline earth metal titanate are superior because of small thermal deterioration. Among them, the composition composed of potassium titanate is low in thermal deterioration.

Embodiment 6

Figure 4:
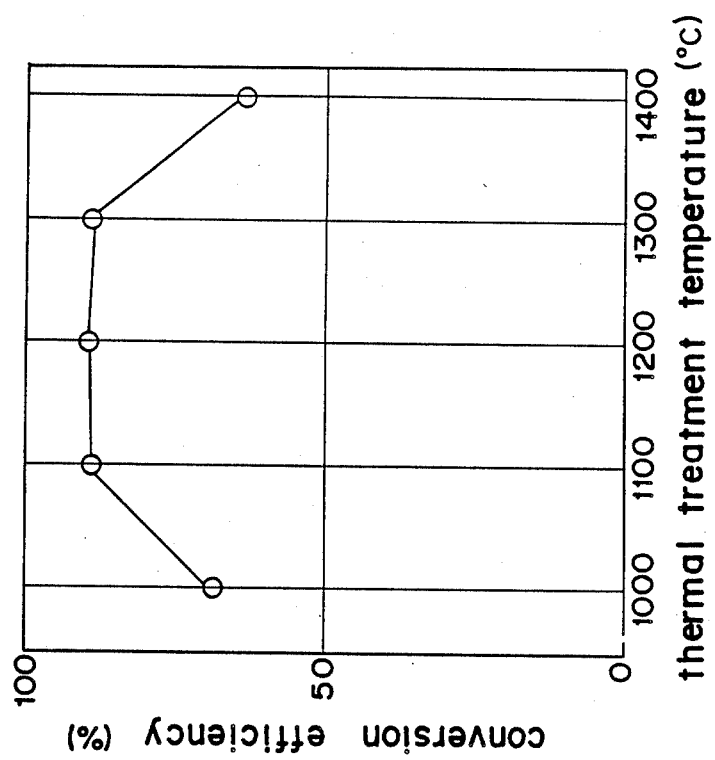
FIG. 4 is a graph showing the relationship between thermal treatment temperatures and the carried catalyst performance where in purifying the exhaust gases.

In the No. 3 honeycomb molding of embodiment 5, each catalyst performance within the range of 1,000 through 1,400° C. in the thermal treatment performance is measured and evaluated by evaluation method 1. The purification performance results after the thermal treatment are shown in FIG. 4. At the thermal treatment temperature of 1,100° C. or lower the thermal deterioration of the catalyst is large as shown in FIG. 4. Also, even at 1,300° C. or more, the thermal deterioration is large. Although the reason is not apparent, it is considered that the ceramic carrier provided at the thermal treatment temperature of 1,100° C. or lower is unstable with respect to the heat, reacts wit the platinum and rhodium noble metals to lower the catalyst performance. On the other hand, it is considered that the ceramic carrier provided in the thermal treatment temperature of 1,300° C. or more is extremely stable with respect to the heat, the surface is vitrified, the specific surface area becomes 1.0 m² or lower per gram, the carried platinum and rhodium catalyst substances are moved, diffused on the surface of the carrier to cause aggregation and, are suddenly deteriorated.

Figure 5:
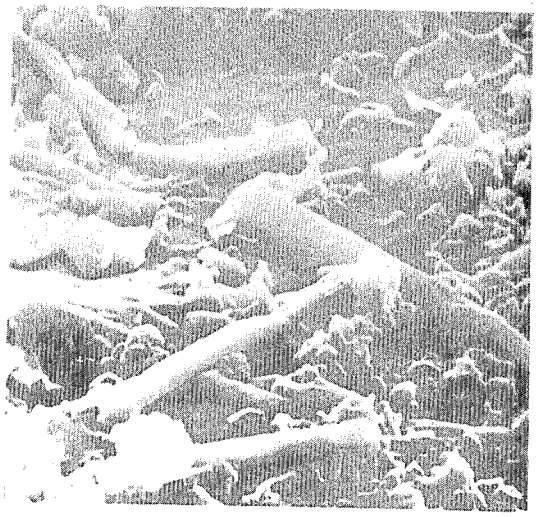
FIGS. 5(A) and (B) are scanning microscope photographs each showing the surface particle condition of the carrier of the catalyst for purifying the exhaust gases.
Figure 5B:

The scanning type electron microscope of the section of the honeycomb-shaped ceramic carrier provided through the thermal treatment at 1,000° C. and the section of the honeycomb-shaped ceramic carrier provided through the thermal treatment at 1,400° C. are shown in FIG. 5. FIG. 5A shows the scanning type electron microscope photograph (20,000×) of the honeycomb-shaped ceramic section provided through the thermal treatment at 1,000° C. FIG. 5B shows the scanning type electron microscope photograph (20,000×) of the honeycomb shaped ceramic section provided through the thermal treatment at 1,400° C. As is apparent, the properties (particularly the property as catalyst carrier) of the ceramics provided by the thermal treatment temperature greatly changes.

As is clear from the foregoing description, according to the present invention, the catalystic carrier ceramics which are superior in catalystic performance and further, which are small in thermal expansion coefficient as well as superior in thermal shock resistance may be provided at lower cost at comparatively lower temperatures.

Although the present invention has been fully described with reference to the accompanying drawings, it is to be noted here that various changes and modifications will be apparent to those skilled in the art. Therefore, unless otherwise such changes and modifications depart from the scope of the present invention, they should be construed as included herein.

What is claimed is:

1. A catalyst for purifying exhaust gases comprising a carrier and a catalytic compound deposited on the carrier, said carrier being a ceramic produced by heating a composition comprising a mixture of 5 to 20 parts by weight rehydratable alumina, 1 to 10 parts by weight of alkali or alkaline earth metal titanate and 70 to 94 parts by weight of fused silica at a temperature of 1100° to 1300° C.

2. The catalyst for purifying exhaust gases in accordance with claim 1 wherein the alkali or alkaline earth metal titanate is potassium titanate.

3. The catalyst according to claim 1 wherein said catalytic compound comprises platinum and rhodium.